United States Patent [19]

Kean

[11] Patent Number: 5,060,887

[45] Date of Patent: Oct. 29, 1991

[54] APPARATUS FOR DEICING AN AIRCRAFT

[76] Inventor: Charles J. Kean, 78 Crest Rd. West, N. Merrick, N.Y. 11566

[21] Appl. No.: 446,625

[22] Filed: Dec. 6, 1989

[51] Int. Cl.$^5$ .............................................. B64D 15/10
[52] U.S. Cl. .............................. 244/134 C; 244/134 R
[58] Field of Search ...................... 244/134 R, 134 C; 134/45, 123

[56] References Cited

U.S. PATENT DOCUMENTS 3,612,075  10/1971  Cook ................................ 244/134 C
4,634,084  1/1987  Magnusson ..................... 244/134 C

OTHER PUBLICATIONS

WO 79/00331, 6-1979, Magnusson et al.

Primary Examiner—Joseph F. Peters, Jr.
Assistant Examiner—Anne E. Bidwell
Attorney, Agent, or Firm—Michael I. Kroll

[57] ABSTRACT

An improved apparatus for deicing an aircraft is provided and consists of a recycling system which applies deicing liquid onto an aircraft and then recovers the deicing liquid back so that the deicing liquid can be used again.

1 Claim, 3 Drawing Sheets

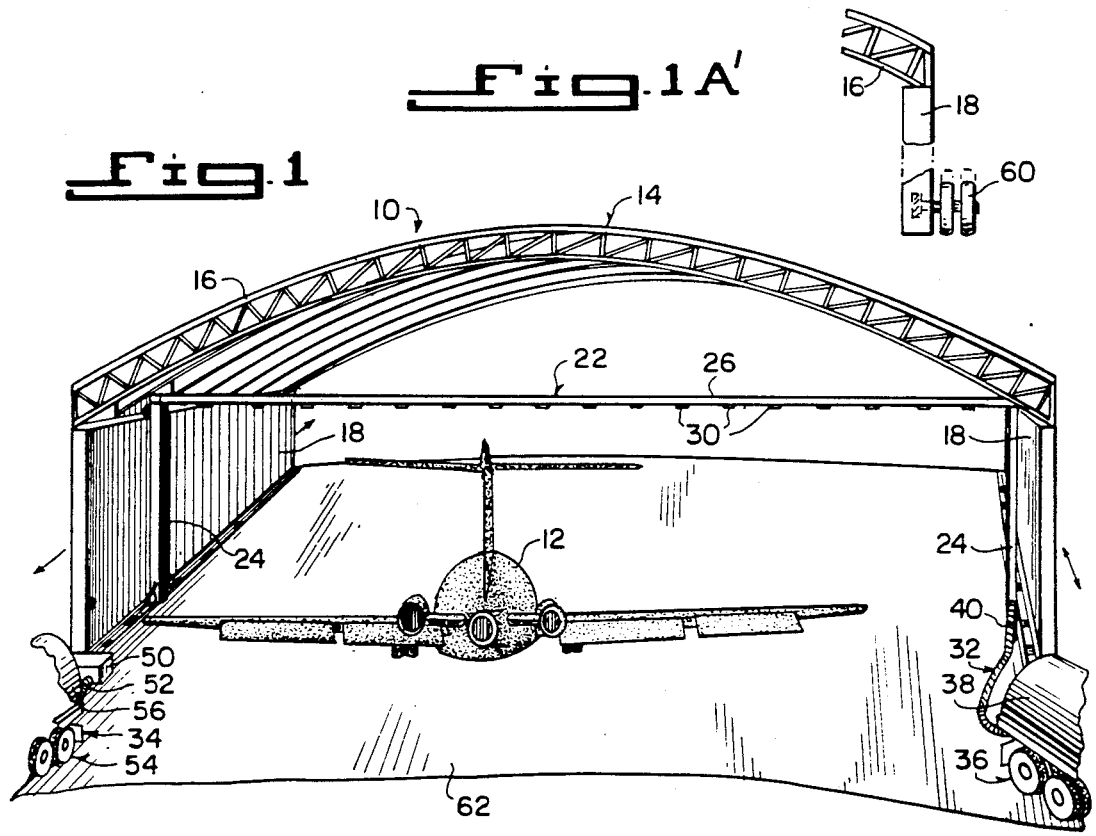
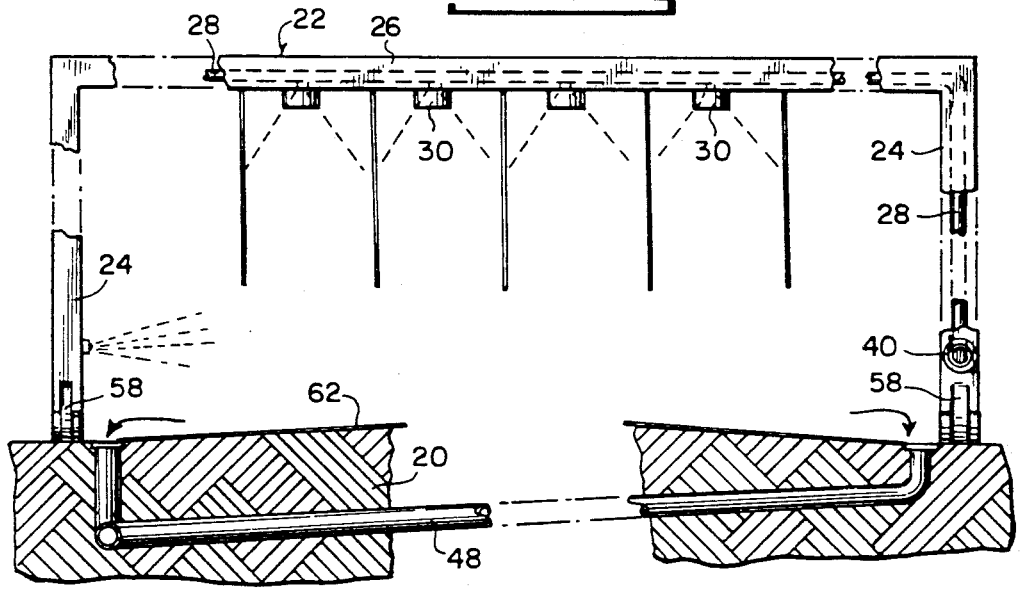

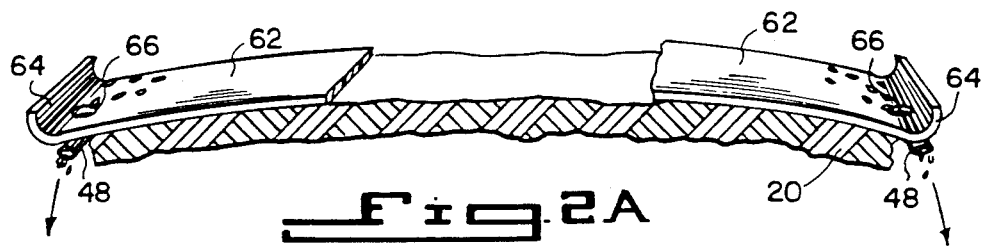
Fig. 2A
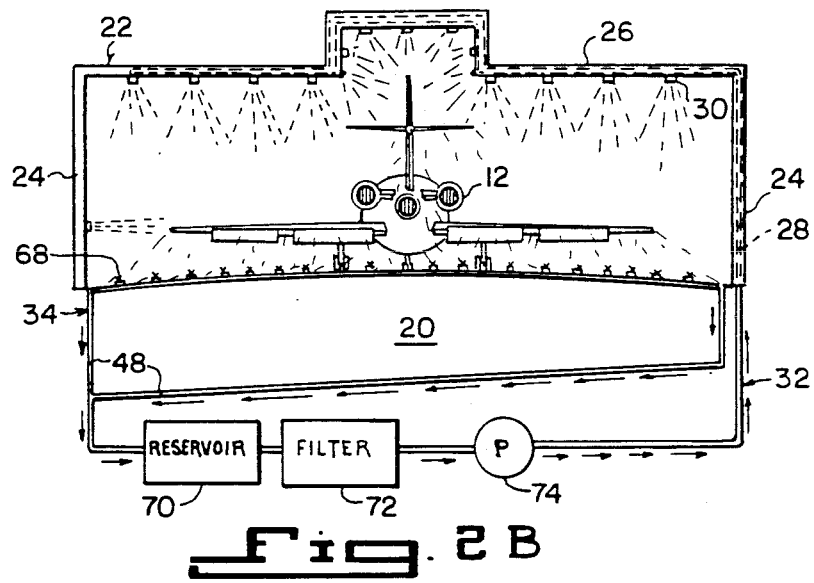
Fig. 2B
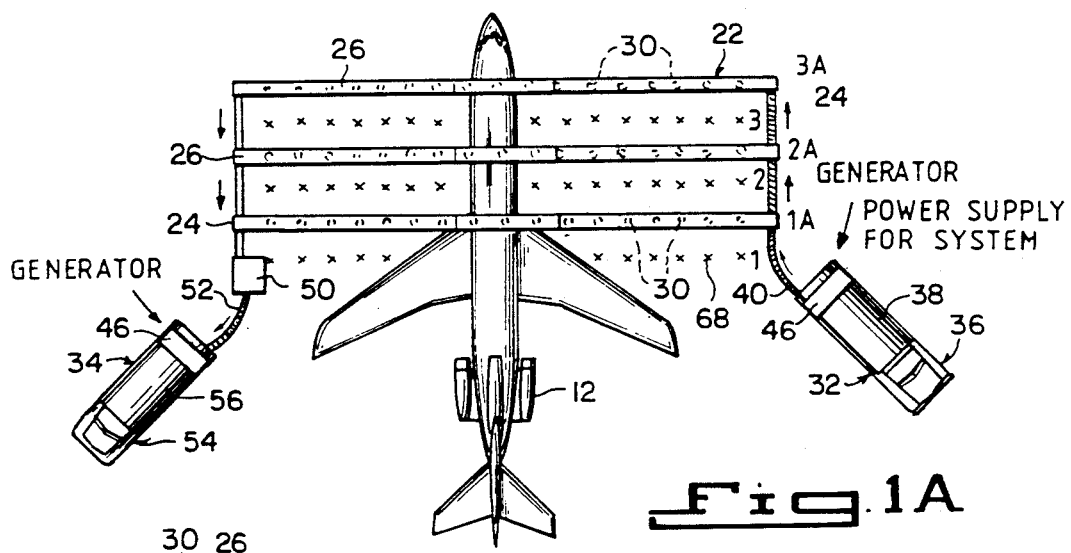
Fig. 1A
30 26
= NOZZLES IN ROOF
68 ⟶ × × = CONTROLLING PHOTOCELLS/DETECTORS IN FLOOR CONTROLLING ABOVE NOZZLES
Fig. 1B

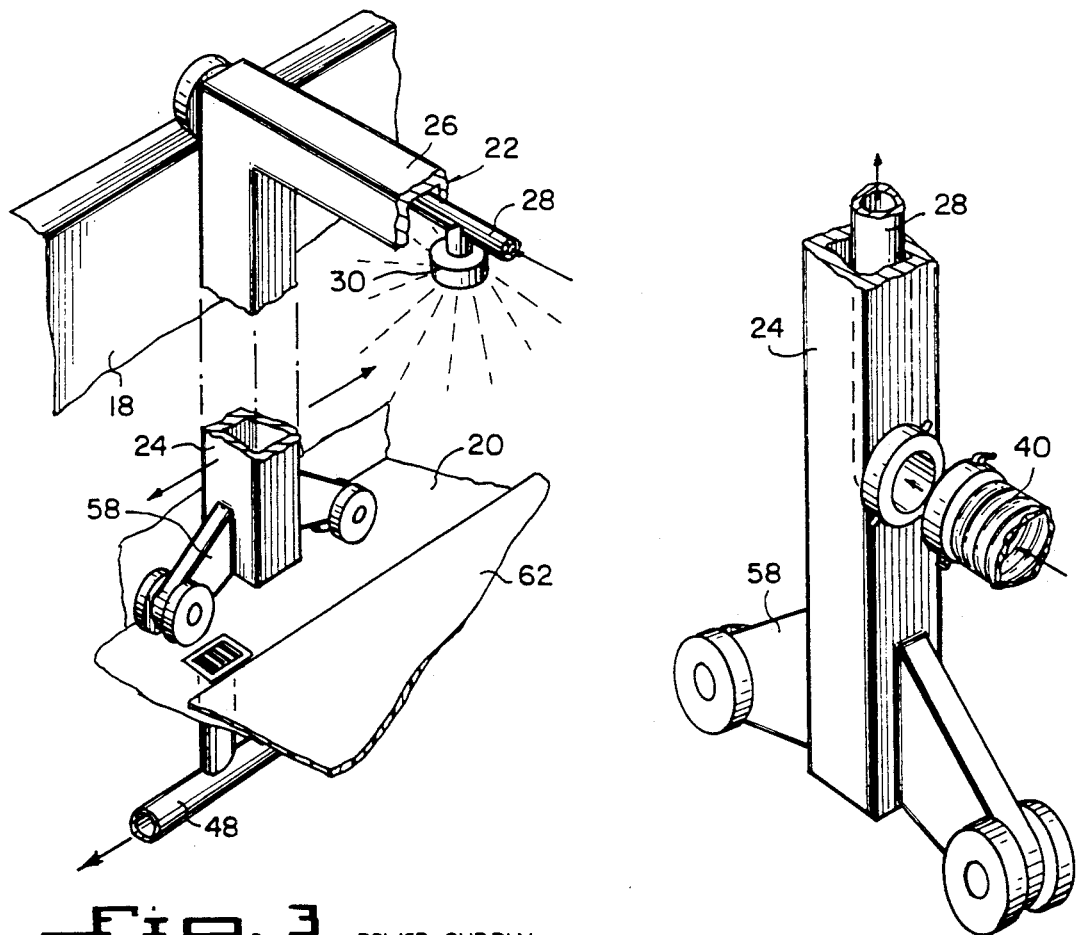
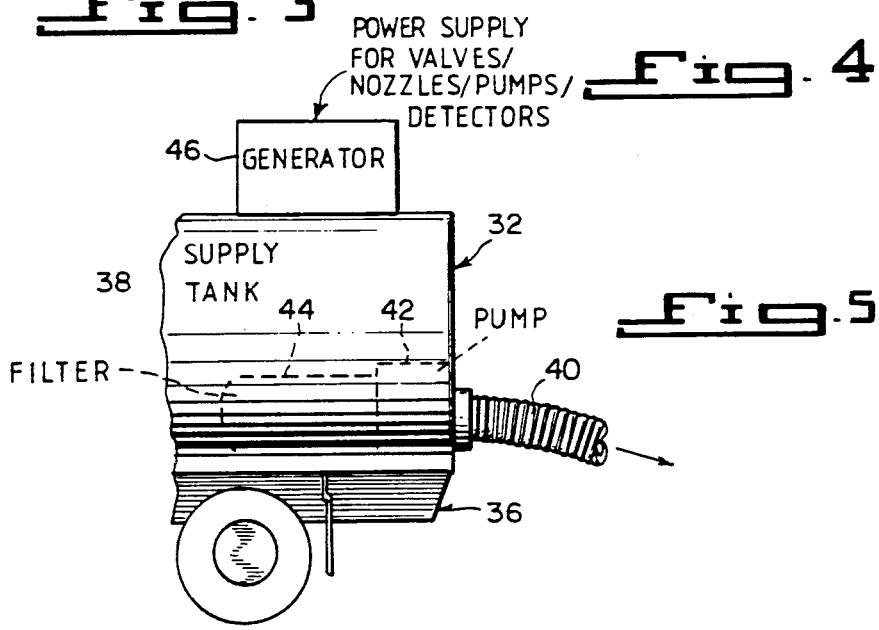

APPARATUS FOR DEICING AN AIRCRAFT

BACKGROUND OF THE INVENTION

1. Field of the Invention

The instant invention relates generally to deicing devices and more specifically it relates to an improved apparatus for deicing an aircraft.

2. Description of the Prior Art

Numerous deicing devices have been provided in prior art that are adapted to remove ice from the wings, fuselage and tail of aircraft. For example, U.S. Pat. No. 4,723,733 to McClinchy is illustrative of such prior art. While these units may be suitable for the particular purpose to which they address, they would not be as suitable for the purposes of the present invention as heretofore described.

SUMMARY OF THE INVENTION

A primary object of the present invention is to provide an improved apparatus for deicing an aircraft that will overcome the shortcomings of the prior art devices.

Another object is to provide an improved apparatus for deicing an aircraft that is a system to apply deicing liquid which is ethylene glycol, onto an aircraft and then recover the deicing liquid back so that the deicing liquid can be used again.

An additional object is to provide an improved apparatus for deicing an aircraft that will stop environmental polution of the surrounding area since all of the deicing liquid that runs off the surface of the aircraft is recoverable.

A further object is to provide an improved apparatus for deicing an aircraft that is simple and easy to use.

A still further object is to provide an improved apparatus for deicing an aircraft that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view with parts broken away of the invention.

FIG. 1A is a top diagrammatic view thereof with the roof removed.

FIG. 1A' is a front view of a portion of the shelter showing transport wheels thereon.

FIG. 1B is a chart to indicate the locations of the nozzles and photo cells/detectors.

FIG. 2 is a front view with parts broken away and in section of the mobile support structure and drain lines within the floor.

FIG. 2A is a perspective view partly in section and broken away of the liner on the floor.

FIG. 2B is a diagrammatic front view of a modification in which the deicing fluid is recycled back to be used again.

FIG. 3 is a perspective view with parts broken away of the left side of the mobile support structure shown in FIG. 2.

FIG. 4 is a perspective view with parts broken away of the right side of the mobile support structure.

FIG. 5 is a side view with parts broken away of the supply tanker truck in greater detail.

DETAILED DESCRIPTION OF THE PREFERRED EMBODIMENTS

Turning now descriptively to the drawings, in which similar reference characters denote similar elements throughout the several views, the Figures illustrate an improved apparatus 10 for deicing an aircraft 12 consisting of a shelter 14 having a roof 16 and a pair of side walls 19 supported on a floor 20. Support structures 22 are provided in which each have a pair of vertical members 24 and a horizontal member 26. Each vertical member 24 extends up one of the side walls 19 while the horizontal member 26 extends across under the roof 16 of the shelter 14. A feed line 18 extends through one of the vertical members 24 and the horizontal member 26. A plurality of spray nozzles 30 are spaced apart and support on the horizontal member 26 and are fluidly connected to the feed line 18. A first system 32 is provided for automatically applying deicing liquid through the feed line 18 and out of the spray nozzles 30 onto the air craft 12. A second system 34 is for recovering the deicing liquid so that the deicing liquid can be used again.

The first system 32 includes a first tanker truck 36 having a tank 38 with the deicing liquid therein. A delivery hose 40 is coupled between the tank 38 and the feed line 18 in the vertical member 24. S delivery pump 42 within the tank 38 is coupled to the delivery hose 40. A filter 44 is coupled to the pump 42 while a generator 46 on the tank 38 is to activate the pump 42.

The second system 34 includes a drail line 48 formed within the floor 20 to capture the deicing liquid after being dispensed from the spray nozzles 30. A recovery pump 50 is coupled to the drain line 48, while a recovery hose 52 is coupled to the recovery pump 50. A second tanker truck 54 has a tank 56 that is coupled to the recovery hose 52 so that the pump 50 can pump the deicing liquid into the tank 56 of the second tanker 54.

The support structures 22 include wheel assemblies 60 on each vertical member 24 so that the support structures 22 are mobile. The side walls 19 of the shelter 14 include transport wheel assemblies 60 so that the shelter 14 is mobile.

A polyethylene resin liner 62 is also provided and can have curb edges 64 and drain holes 66 so that the liner 62 can protect the floor 20 and guide the deicing liquid into the drain line 48. The apparatus 10 can also include a plurality of sensors 68, which can be either photocells or dedectors, in the floor 20 that will activate the recovery pump 50 when the aircraft taxis through the shelter 14.

A modified form of the apparatus 10 is shown in FIG. 2B wherein the first system 32 includes a reservoir 70 within the floor 20 for storing the deicing liquid therein. A filter 72 within the floor 20 is coupled to the reservoir 70. A pump 74 within the floor 20 is coupled between the filter 72 and the feed line 18 in the vertical member 24. A plurality of sensors 68 on the floor 20 will activate the pump 74 when the aircraft 12 taxis through the shelter 14.

The second system 34 includes a drain line 48 formed within the floor 20 to capture the deicing liquid after being dispensed from the spray nozzles 30 so as to return to the reservoir 70 to be used again.

LIST OF REFERENCE NUMBERS

10: improved apparatus
12: aircraft
14: shelter
16: roof
19: side wall
20: floor
22: support structure
24: vertical member
26: horizontal member
18: feed line
30: spray nozzle
32: first system
34: second system
36: fitst tanker truck
38: tank in 36
40: delivery hose
42: delivery pump
44: filter
46: generator
48: drain line
50: recovery pump
52: recovery hose
54: second tanker truck
56: tank in 54
58: wheel assembly
60: transport wheel assembly
62: polyethylene resin liner
64: curb edge
66: drain hole
68: sensor
70: reservoir
72: filter in 20
74: pump in 20

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spririt of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved apparatus for deicing an aircraft comprising:
   a) a shelter having a roof and a pair of side walls supported on a floor so that an aircraft can taxi therethrough, said side walls of each shelter include transport wheel assemblies so that said shelter is mobile;
   b) at least one support structure having a pair of vertical members, each extending up one of said side walls and a horizontal member extending across under said roof of said shelter, said at least one support structure includes wheel assembly on each vertical member so that said support structure is mobile;
   c) a feed line extending throuhg one of said vertical members and said horizontal member;
   d) a plurality of spray nozzles spaced apart and supported on said horizontal members and fluidly connected to said feed line;
   e) means for automatically applying deicing liquid through said feed line and out of said spray nozzles onto the aircraft, said automatically applying means include a first tanker truck having a tank with the deicing liquid therein; a delivery hose coupled between said tank and said feed line in said vertical member; a delivery pump within said supply tank coupled to said delivery hose; a filter coupled to said pump; and a generator on said supply tank to activate said pump;
   f) means for recovering the deicing liquid so that the deicing liquid can be used again, said recovery means include a drain line formed within the floor to capture the deicing liquid after being dispensed from said spray nozzles; a recovery pump coupled to said drain line; a recovery hose coupled to said recovery pump; and a second tanker truck having a tank coupled to said recovery hose so that said pump can pump the deicing liquid into said tank of said second tanker;
   g) polyethylene resin liner having curb edges and drain holes so that said line can protect the floor and guide the deicing liquid into said drain line; and
   h) a plurality of sensors in the floor that will activate said recovery pump when said aircraft taxis through said shelter.

* * * * *